(12) United States Patent
Fugel et al.

(10) Patent No.: US 9,732,799 B2
(45) Date of Patent: Aug. 15, 2017

(54) AXIAL BEARING ARRANGEMENT

(71) Applicant: Schaeffler Technologies AG & Co. KG, Herzogenaurach (DE)

(72) Inventors: Wolfgang Fugel, Nuremberg (DE); Andreas Kirschner, Aurachtal (DE); Martin Gegner, Langenfeld (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 182 days.

(21) Appl. No.: 14/653,019

(22) PCT Filed: Nov. 13, 2013

(86) PCT No.: PCT/DE2013/200298
§ 371 (c)(1),
(2) Date: Jun. 17, 2015

(87) PCT Pub. No.: WO2014/094756
PCT Pub. Date: Jun. 26, 2014

(65) Prior Publication Data
US 2016/0348724 A1 Dec. 1, 2016

(30) Foreign Application Priority Data
Dec. 20, 2012 (DE) .......................... 10 2012 223 882

(51) Int. Cl.
*F16C 33/66* (2006.01)
*F16C 19/30* (2006.01)
(Continued)

(52) U.S. Cl.
CPC .......... *F16C 33/6677* (2013.01); *F16C 19/30* (2013.01); *F16C 19/305* (2013.01);
(Continued)

(58) Field of Classification Search
CPC .... F16C 19/30; F16C 19/305; F16C 33/6666; F16C 33/6677
See application file for complete search history.

(56) References Cited

U.S. PATENT DOCUMENTS 4,968,157 A   11/1990   Chiba
5,584,585 A * 12/1996   Premiski ................. F16C 19/30
                                                        384/607
(Continued)

FOREIGN PATENT DOCUMENTS

JP      2012163185        8/2012

*Primary Examiner* — Thomas R. Hannon
(74) *Attorney, Agent, or Firm* — Volpe and Koenig, P.C.

(57) ABSTRACT

An axial bearing arrangement formed substantially of two rotating carrier components (1, 2) with circular ring-shaped end faces (3, 4) and an axial anti-friction bearing (5) arranged between the carrier components (1, 2). This axial anti-friction bearing (5) has a first ring-shaped angle disk (6), which rests on the end face (3) of the first carrier component (1) and which is made from a thin steel sheet, and a second ring shaped angle disk (7), which rests on the end face (4) of the second carrier component (2) and a needle cage (10), which rolls between the axial inner sides (8, 9) of the angle disks (6, 7) and which is formed from a plurality of bearing needles (12) arranged adjacent to one another and held at equal distances to one another by a bearing cage (11), and is lubricated and cooled by a lubricant flow (13) emitted by a shaft which passes centrally through the axial anti-friction bearing (5). According to the invention, a circular ring-shaped ramp disk (14), which is designed as a spring, is arranged between the first carrier component (1) and the first angle disk (6), by which ramp disk a radial annual gap (15) between the first carrier component (1) and the first angle disk (6), which results from the axial clearance of the axial anti-friction bearing (5) in the no-load state, can be sealed to prevent a wrong (Continued)

direction of the lubricant flow (13) and the lubricant flow (13) at the same time, can be systematically routed into the inside of the bearing (16) between the angle disks (6, 7).

7 Claims, 3 Drawing Sheets

(51) Int. Cl.
*F16C 19/46* (2006.01)
*F16C 33/76* (2006.01)
*F16H 57/04* (2010.01)

(52) U.S. Cl.
CPC ............ *F16C 19/46* (2013.01); *F16C 33/761* (2013.01); *F16H 57/0427* (2013.01); *F16H 57/0471* (2013.01); *F16H 57/0482* (2013.01); *F16C 2361/65* (2013.01)

(56) References Cited

U.S. PATENT DOCUMENTS

| | | | | |
|---|---|---|---|---|
| 7,318,676 B2* | 1/2008 | Fugel | ............... | F16C 19/30 |
| | | | | 384/620 |
| 7,748,499 B2* | 7/2010 | Selever | ............... | B60K 17/16 |
| | | | | 184/6.12 |
| 7,985,155 B2* | 7/2011 | Diosi | ............... | F16C 19/30 |
| | | | | 475/160 |
| 2011/0182542 A1* | 7/2011 | Brown | ............... | F16C 19/30 |
| | | | | 384/620 |
| 2016/0290392 A1* | 10/2016 | Brzezinski | ............... | F16C 27/08 |

\* cited by examiner

AXIAL BEARING ARRANGEMENT

FIELD OF THE INVENTION

The invention relates to an axial bearing arrangement that is preferably suitable, in particular, for the axial support of the sun gear carrier of a first planetary gear against the internal gear tip of a second planetary gear in a passenger car automatic transmission.

BACKGROUND

The most common embodiment of passenger car automatic transmissions is a so-called torque converter transmission that differs from conventional and automated shifting transmissions primarily by a shifting process that does not interrupt the tensile force. Such passenger car automatic transmissions usually have a hydraulic torque converter as a starter clutch and are comprised essentially of several multiple-disk clutches and a combination of several freewheels and planetary gears. All shifting and coupling processes are here performed via the multiple-disk clutches that produce the non-positive connection of the individual planetary gear stages to the input and output shafts of the automatic transmission.

Because considerable axial forces are also applied between the transmission parts during the individual shifting processes due to the typical helical gearing of the planetary wheels of the planetary gear, in modern automatic transmissions, for preventing friction losses and reduced efficiency, the individual clutch and planet carriers are supported relative to each other by a plurality of axial needle bearings. In special cases, individual planet carriers rotating in one direction in a planetary gear must be supported axially relative to each other against individual planet carriers rotating in the other direction in an adjacent planetary gear. Such a known bearing between the sun wheel carrier of a first planetary gear and the adjacent internal gear tip of a second planetary gear in a passenger car automatic transmission is shown as an example in FIG. 1 of the accompanying drawings and is formed essentially of the two rotating carrier components 1, 2 with circular ring-shaped end faces 3, 4 that face each other and between which an axial roller bearing 5 is arranged. Here, the axial roller bearing 5 has a first ring-shaped angled disk 6 made from a thin steel sheet contacting the end face 3 of the first carrier component 1 and a second ring-shaped angled disk 7 made from a thin steel sheet contacting the end face 4 of the second carrier component 2, as well as a needle cage 10 that rolls between the axial inner sides 8, 9 of the angled disks 6, 7 and is formed by a plurality of bearing needles 12 arranged one next to the other and held at equal distances from each other by a bearing cage 11 and is lubricated and cooled by a lubricant flow 13 emerging from a shaft guided centrally through the axial roller bearing 5.

One special feature of axial roller bearings 5 arranged in this way is that these have high differential rotational speeds resulting from the different directions of rotation of the adjacent planet carriers 1, 2 also in the no-load state and therefore require sufficient lubrication and cooling also in the no-load state. In practice, however, it has been shown that under such no-load conditions, a radial ring gap 15 resulting from the axial play of the axial roller bearing 5 is produced between the first carrier component 1 and the first angled disk 6, through which the majority of the lubricant flow 13 emerging from the shaft guided centrally through the axial roller bearing 5 escapes, so that the axial roller bearing 5 is no longer adequately lubricated and cooled. The insufficient lubrication consequently leads to overheating and bearing damage that might cause a failure of the entire automatic transmission.

SUMMARY

Starting from the described disadvantages of the known prior art, the invention is based on the objective of designing an axial bearing arrangement of the described type in which it is guaranteed that the axial roller bearing is adequately lubricated and cooled also in the no-load state.

According to the invention, this object is achieved for an axial bearing arrangement in that, between the first carrier component and the first angled disk, there is an elastic, circular ring-shaped ramp disk with which a radial ring gap resulting from the axial play of the axial roller bearing in the no-load state between the first carrier component and the first angled disk can be sealed to prevent the lubricant flow from flowing in the wrong direction and the lubricant flow can be introduced at the same time in a targeted manner into the bearing interior between the angled disks.

Preferred constructions and advantageous refinements of the axial bearing arrangement according to the invention are described below and in the claims.

According to one embodiment it is provided for the axial bearing arrangement according to the invention that the circular ring-shaped ramp disk has a profile cross section with a vertical outer section, an at least approximately horizontal middle section, and an inner section running at an angle from the middle section to the carrier component.

The vertical outer section of the ramp disk is here arranged according to another embodiment together with an additional spacer ring disk between the first carrier component and the first angled disk and extends up to below the inner diameter of the first angled disk. The additional spacer disk has, in a known way, the function of an axial play compensation element in that this is formed with a thickness corresponding to the tolerance chain of all of the components arranged axially following the axial roller bearing. The thickness of the spacer disk can then be reduced in a simple way by the thickness of the ramp disk, so that the ramp disk according to the invention requires no changes to the surrounding structure. The scope of protection of the present invention shall also include, however, axial bearing arrangements in which such a spacer disk is not required.

The horizontal middle section of the ramp disk contacting the vertical outer section over a radius then extends accordingly to another embodiment slightly up to above the plane of the inside of the first angled disk and has another rounded transition to the angled inner section that is formed as a breakaway edge for the lubricant flow directed toward the axial roller bearing. The horizontal middle section and the angled inner section of the ramp disk thus together form a ramp that guides the lubricant flow initially over the inner diameter edge of the first angled disk of the axial roller bearing. At the breakaway edge at the end of the ramp, the lubricant flow then breaks away from the ramp due to centrifugal force and is guided unimpaired into the bearing interior between the angled disks of the axial roller bearing.

The angled inner section of the ramp disk is then constructed according to another embodiment in its angled design and length such that this comes into contact with the inner diameter of the ramp disk on the first carrier component and is under constant pre-tension in the installed state of the ramp disk. This means that the angled inner section has a length oriented to the height of the circular ring-shaped end face of the first carrier component and is arranged at an angle to the radial axis of the axial roller bearing such that the inner diameter of the ramp disk already contacts the first carrier component before the vertical outer section of the ramp disk contacts the spacer disk. Therefore, the angled inner section is subject to a pre-tension force in the installed state of the ramp disk, which prevents lubricant from flowing under the ramp disk and seals the radial ring gap produced in the no-load state between the first carrier component and the first angled disk so that the lubricant flow is not in the wrong direction.

An advantageous construction of the axial roller bearing arrangement according to the invention provides that the ramp disk has a uniform material thickness between 0.2 mm and 0.4 mm and is preferably made from a pre-hardened spring steel strip. Here, a spring steel strip of type C75 S H+A has proven most suitable due to its ductility. It is also possible, however, to make the ramp disk from an unalloyed steel sheet strip, wherein a steel sheet strip of type DC 03 appears to be most suitable due to its high drawing grade.

In summary, the axial bearing arrangement according to the invention has the advantage, compared with the axial bearing arrangements known from the prior art, that through the arrangement of an additional elastic ramp disk between the first carrier component and the first angled disk, the lubricant is prevented from flowing in the wrong direction through a radial ring gap resulting from the axial play of the axial roller bearing in the no-load state between the first carrier component and the first angled disk. In addition, through a targeted introduction of the lubricant flow over the ramp of the ramp disk into the bearing interior, the axial roller bearing is adequately lubricated and cooled at all times, so that bearing damage and failure of the whole automatic transmission resulting from insufficient lubrication and overheating can be prevented.

BRIEF DESCRIPTION OF THE DRAWINGS

A preferred embodiment of the axial bearing arrangement formed according to the invention is explained in more detail below with reference to the accompanying drawings. Shown are.

DETAILED DESCRIPTION OF THE PREFERRED EMBODIMENTS

Figure 1:
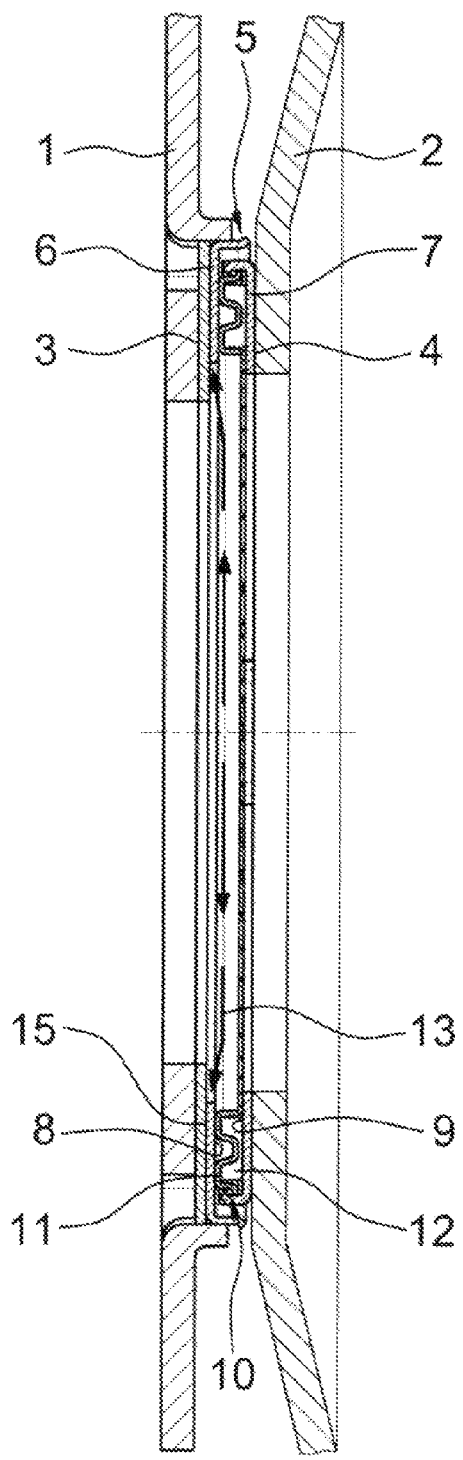
FIG. 1 a cross section through an axial bearing arrangement between the sun wheel carrier of a first planetary gear and the internal gear tip of a second planetary gear in a passenger car automatic transmission according to the prior art.
Figure 2:
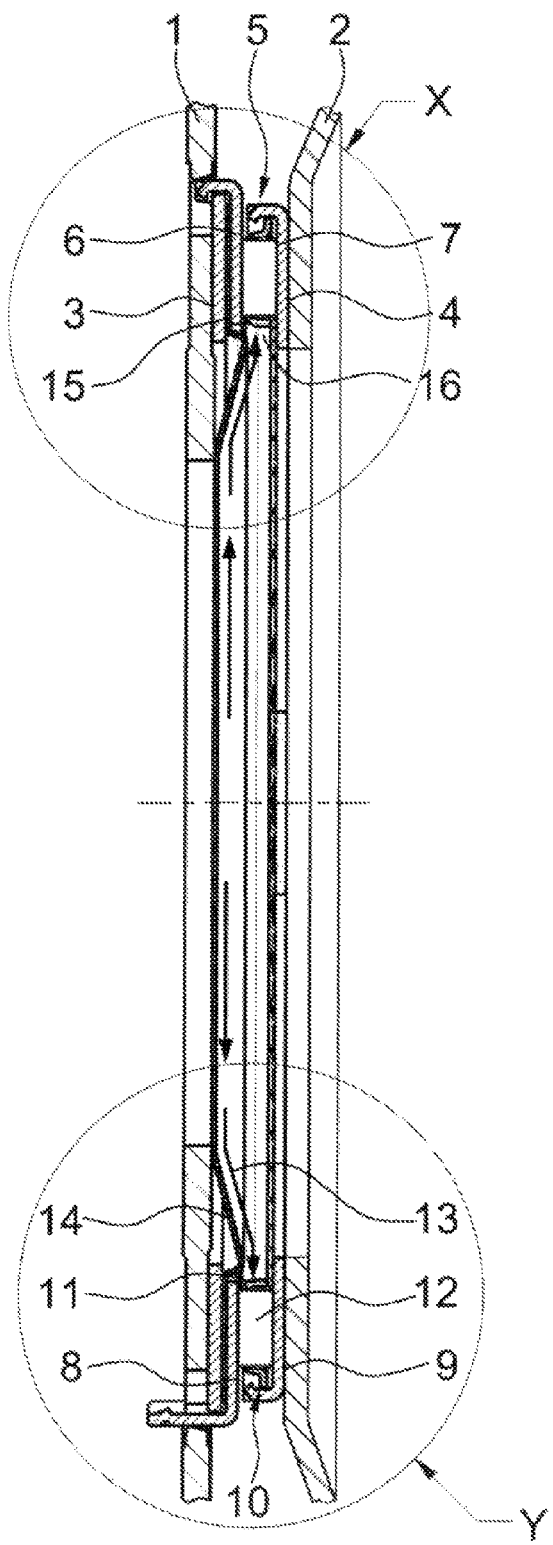
FIG. 2 a cross section through an axial bearing arrangement formed according to the invention between the sun wheel carrier of a first planetary gear and the internal gear tip of a second planetary gear in a passenger car automatic transmission.

From FIG. 2, an axial bearing arrangement between the sun wheel carrier 1 of a first planetary gear and the internal gear tip 2 of a second planetary gear in a passenger car automatic transmission can be seen, which is formed essentially from the two rotating carrier components 1, 2 formed with circular ring-shaped end faces 3, 4 and an axial roller bearing 5 arranged between these carrier components 1, 2. It is clear that this axial roller bearing 5 has, in a known way, a first ring-shaped angled disk 6 made from a thin steel sheet contacting the end face 3 of the first carrier component 1 and a second ring-shaped angled disk 7 made from a thin steel sheet contacting the end face 4 of the second carrier component 2 and also a needle cage 10 that rolls between the axial inner sides 8, 9 of the angled disks 6, 7 and is formed by a plurality of bearing needles 12 arranged one next to the other and held at an equal distance to each other by a bearing cage 11. In addition, in FIG. 2 it is indicated by directional arrows that the axial roller bearing 5 is lubricated and cooled by a lubricant flow 13 that emerges from a shaft guided centrally through the axial roller bearing 5 and not shown in more detail in the drawing.

Figure 3:
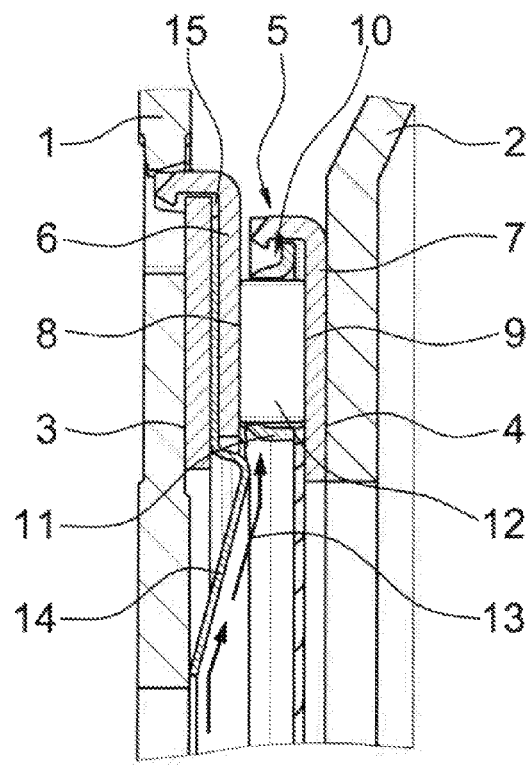
FIG. 3 an enlarged representation of the detail X according to FIG. 2.
Figure 4:
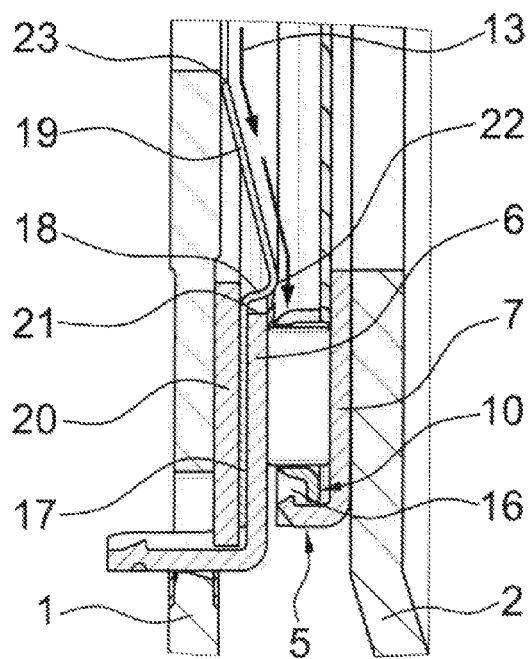
FIG. 4 an enlarged representation of the detail Y according to FIG. 2.

In addition, from FIG. 2 and the enlarged representations of FIGS. 3 and 4, it emerges that, between the first carrier component 1 and the first angled disk 6, there is an elastic, circular ring-shaped ramp disk 14 with which a radial ring gap 15 resulting from the axial play of the axial roller bearing 5 in the no-load state between the first carrier component 1 and the first angled disk 6 can be sealed to prevent a lubricant flow 13 in the wrong direction and the lubricant flow 13 can be guided at the same time in a targeted manner into the bearing interior 16 between the angled disks 6, 7. This circular ring-shaped ramp disk 14 here has a profile cross section with a vertical outer section 17, an at least approximately horizontal middle section 18, and an inner section 19 running at an angle from the middle section 18 to the carrier component 1 with a uniform material thickness between 0.2 mm and 0.4 mm and is made preferably from a pre-hardened spring steel strip of type C75 S H+A.

FIGS. 3 and 4 additionally show that the vertical outer section 17 of the ramp disk 14 is arrange, together with an additional spacer ring disk 20, between the first carrier component 1 and the first angled disk 6 and extends to below the inner diameter 21 of the first angled disk 6. The horizontal middle section 18 of the ramp disk 14, in contrast, extends to slightly above the plane of the inner side 8 of the first angled disk 6 and has a rounded transition to the angled inner section 19 that is formed as a breakaway edge 22 for the lubricant flow 13 again indicated with directional arrows. The angled inner section 19 of the ramp disk 14 is finally formed in its angled design and length such that this contacts with the inner diameter 23 of the ramp disk 14 on the carrier component 1 and is under a constant pre-tension force in the installed state of the ramp disk 14. In this way, the lubricant flow 13 is prevented from flowing under the ramp disk 14 and the radial ring gap 15 produced in the no-load state between the first carrier component 1 and the first angled disk 6 is sealed to prevent the lubricant flow 13 from flowing in the wrong direction.

LIST OF REFERENCE NUMBERS

1 Carrier component
2 Carrier component
3 End face of 1
4 End face of 2
5 Axial roller bearing
6 First angled disk of 5
7 Second angled disk of 5
8 Inner side of 6
9 Inner side of 7
10 Needle cage
11 Bearing cage of 10
12 Roller body of 10

13 Lubricant flow
14 Ramp disk
15 Radial ring gap
16 Bearing interior
17 Outer section of 14
18 Middle section of 14
19 Inner section of 14
20 Spacer ring disk
21 Inner diameter of 6
22 Breakaway edge
23 Inner diameter of 14

The invention claimed is:

1. An axial bearing arrangement comprising two rotating carrier components with circular ring-shaped end faces an axial roller bearing is arranged between the ring-shaped end faces and has a first annular angled disk made from a thin steel sheet and a second annular angled disk made from a thin steel sheet that contacts the end face of the second carrier component, and a needle cage that rolls between axial inner sides of the angled disks and is formed from a plurality of bearing needles arranged adjacent to each other and held at equal distances to each other by a bearing cage, and is lubricated and cooled by a lubricant flow emerging from a shaft guided centrally through the axial roller bearing, an elastic, circular ring-shaped ramp disk arranged between the first carrier component and the first angled disk, said elastic, circular ring-shaped ramp disk seals a radial ring gap resulting from axial play of the axial roller bearing in a no-load state between the first carrier component and the first angled disk to prevent the lubricant flow from flowing in a wrong direction and the lubricant flow is introduced simultaneously in a targeted manner into a bearing interior between the angled disks.

2. The axial bearing arrangement according to claim 1, wherein the circular ring-shaped ramp disk has a profiled cross section with a vertical outer section that extends parallel to the ring-shaped end faces, an at least approximately horizontal middle section, and an inner section running at an angle from the middle section to the first carrier component.

3. The axial bearing arrangement according to claim 2, wherein the vertical outer section of the ramp disk is arranged, together with an additional spacer ring disk, between the first carrier component and the first angled disk and extends to below an inner diameter of the first angled disk.

4. The axial bearing arrangement according to claim 3, wherein the horizontal middle section of the ramp disk extends to slightly above a plane of an inner side of the first angled disk and has a rounded transition to the angled inner section that is constructed as a breakaway edge for the lubricant flow.

5. The axial bearing arrangement according to claim 4, wherein the angled inner section of the ramp disk is constructed with an angle and length such that it contacts with an inner diameter of the ramp disk on the first carrier component and is in permanent pre-tension in an installed state of the ramp disk.

6. The axial bearing arrangement according to claim 1, wherein the ramp disk has a uniform material thickness between 0.2 mm and 0.4 mm.

7. The axial bearing of claim 6, wherein the ramp disk is made from a pre-hardened spring steel strip or an unalloyed steel sheet strip.

* * * * *